(12) United States Patent
Pedersen et al.

(10) Patent No.: US 12,213,494 B2
(45) Date of Patent: Feb. 4, 2025

(54) PUMP FOR PUMPING HEAT-SENSITIVE FLUIDS

(71) Applicant: SPX FLOW TECHNOLOGY DANMARK A/S, Silkeborg (DK)

(72) Inventors: Bent Pedersen, Højbjerg (DK); Knud Thorsen, Gjern (DK); Jørgen Madsen, Silkeborg (DK); Ole Poulsen, Engesvang (DK)

(73) Assignee: SPX Flow Technology Danmark A/S, Silkeborg (DK)

( * ) Notice: Subject to any disclaimer, the term of this patent is extended or adjusted under 35 U.S.C. 154(b) by 984 days.

(21) Appl. No.: 16/606,602

(22) PCT Filed: Apr. 18, 2018

(86) PCT No.: PCT/EP2018/059936
§ 371 (c)(1),
(2) Date: Oct. 18, 2019

(87) PCT Pub. No.: WO2018/192991
PCT Pub. Date: Oct. 25, 2018

(65) Prior Publication Data
US 2020/0037625 A1 Feb. 6, 2020

(30) Foreign Application Priority Data
Apr. 18, 2017 (DK) .............................. PA201770269

(51) Int. Cl.
*A23C 3/033* (2006.01)
*A23L 2/46* (2006.01)
(Continued)

(52) U.S. Cl.
CPC ................ *A23C 3/033* (2013.01); *A23L 2/46* (2013.01); *F04D 7/02* (2013.01); *A23L 3/16* (2013.01);
(Continued)

(58) Field of Classification Search
CPC ........ F04D 29/406; F04D 29/588; A23L 2/46; A23L 3/16; A23C 3/033
See application file for complete search history.

(56) References Cited

U.S. PATENT DOCUMENTS 3,371,613 A * 3/1968 Dahlgren .............. F04D 29/586
417/368
5,250,863 A * 10/1993 Brandt .................. F04D 13/086
310/87
(Continued)

FOREIGN PATENT DOCUMENTS

DE 25 07 846 A1 9/1975
DE 102016008558 A1 12/2017
(Continued)

OTHER PUBLICATIONS

Machine translation of WO 2016116428, Rahm et al., published Jul. 28, 2016 (Year: 2016).*
(Continued)

*Primary Examiner* — David E Sosnowski
*Assistant Examiner* — Jason G Davis
(74) *Attorney, Agent, or Firm* — IceMiller LLP

(57) ABSTRACT

Disclosed is a centrifugal pump for pumping a heat-sensitive fluid foodstuff, comprising a volute casing having an inlet port and an outlet port for the heat sensitive fluid, the volute casing enclosing an impeller comprising a disc operably associated with an end of a shaft, said disc having a first surface and a second surface opposite the first surface, said first surface facing the inlet of the casing and being provided with vanes, wherein the second surface of the disc of the impeller is exposed to a cooling medium. The centrifugal pump is suitable for reducing the built-up of fouling on the surface of the impeller disc facing the inlet of the casing and being provided with vanes.

21 Claims, 3 Drawing Sheets

(51) Int. Cl.
*A23L 3/16* (2006.01)
*F04D 7/02* (2006.01)
*F04D 29/22* (2006.01)
*F04D 29/40* (2006.01)
*F04D 29/58* (2006.01)

(52) U.S. Cl.
CPC ............ *F04D 29/22* (2013.01); *F04D 29/406* (2013.01); *F04D 29/588* (2013.01)

(56) References Cited

U.S. PATENT DOCUMENTS

| | | | |
|---|---|---|---|
| 5,281,088 A * | 1/1994 | Brandt | F04D 29/2266 415/171.1 |
| 5,881,638 A | 3/1999 | Kjaerulff et al. | |
| 6,190,123 B1 | 2/2001 | Wunderwald et al. | |
| 2004/0062635 A1 | 4/2004 | Serio | |

FOREIGN PATENT DOCUMENTS

| | | | | |
|---|---|---|---|---|
| EP | 0 794 706 B1 | | 8/2000 | |
| EP | 2 067 999 A1 | | 6/2009 | |
| JP | 03-189400 A | | 8/1991 | |
| JP | 10-509874 A | | 9/1998 | |
| JP | 2000-054996 A | | 2/2000 | |
| JP | 2004 301098 A | | 10/2004 | |
| JP | 2009-91935 A | | 4/2009 | |
| JP | 2009091935 A | * | 4/2009 | ........... F04D 29/284 |
| WO | 2016/012026 A1 | | 1/2016 | |
| WO | WO-2016116428 A1 | * | 7/2016 | ............... B01D 3/10 |
| WO | 2017/207092 A1 | | 12/2017 | |
| WO | 2018/010837 A1 | | 1/2018 | |
| WO | 2018/115131 A1 | | 6/2018 | |

OTHER PUBLICATIONS

International Search Report from PCT/EP2018/059936; mailed Jul. 19, 2018.

\* cited by examiner

PUMP FOR PUMPING HEAT-SENSITIVE FLUIDS

CROSS-REFERENCE TO RELATED APPLICATIONS

The present application is a National Stage of International Patent Application No. PCT/EP2018/059936, filed on Apr. 18, 2018, and claims priority to Danish Patent Application No. PA201770269, filed on Apr. 18, 2017, the contents of which are incorporated herein by reference in their entirety.

INTRODUCTION

The present invention relates to a centrifugal pump suitable for pumping heat-sensitive fluid foodstuff. Furthermore, the invention relates to an infusion plant comprising said centrifugal pump. The centrifugal pump and the infusion plant obtain longer run times because the down time for cleaning the pump for fouling is reduced.

BACKGROUND ART

EP 0 794 706 discloses an infusion plant for high temperature treatment heat-sensitive fluid foodstuffs, such as whey protein concentrate and cheese milk. The plant has an infusion chamber, in which the fluid is subjected to a heat treatment by feeding steam. The food product is introduced at the top of the infusion chamber as a bundle of separate and mainly downwardly directed jets of foodstuff. The lower section of the infusion chamber serves to collect the foodstuff and has cooled walls using a cooling jacket. An outlet opening of the infusion chamber is arranged at the bottom of the infusion chamber and the outlet opening is connected to the inlet of a positive-displacement pump. The outlet of the positive-displacement pump is connected to the inlet of a vacuum chamber that serves to remove water from the food product that was added during the steam infusion.

Centrifugal pumps have been designed for a number of applications. Thus, EP 2067999 A1 discloses a liquid cooled turbocharger impeller. At the backside of the impeller inlets provide cooling medium to a cavity for cooling the disc. The cooling medium exits the cavity on the backside of the impeller through an outlet. The turbocharger is not designed for pumping heat sensitive fluid foodstuff which may foul the impeller. Instead the turbochargers are used in diesel engines and the purpose of cooling the impeller is to extend the operating life of the turbocharger. JP 2009091935 relates to a centrifugal compressor in which a compressible fluid such as compressed air is sucked by the impeller. The impeller is cooled on the backside with air which has been conveyed into the space through a groove. The cooling air enters through a channel and is powered by a cooling fan and exits through another channel.

The infusion plant uses high temperature for a short time to kill micro-organisms by steam infusion. This technology is widely used in the dairy industry where products can lose their nutritional value, flavour and appearance as micro-organisms multiply. These organisms thrive at certain temperatures but if they are not present in a product, the product can be stored for many months without the need for refrigeration. Steam infusion achieves this objective with minimal heat degradation compared with other UHT processes. It helps protect essential components such as vitamins and results in fresh tasting products with outstanding quality. It provides the necessary kill rate for commercial sterility and can handle a wide product viscosity range—covering fluids from milk, puddings, ice cream, baby food, condensed milk, processed cheese, sauces and creams to lotions.

In the known infusion plant a cooling jacket is provided around the bottom section of the infusion chamber for minimizing burn-on and fouling. However, fouling is not completely prevented and cleaning and/or rinsing of the infusion chamber is necessary after a given period of operation, depending e.g. on the type of foodstuff.

The fouling in the infusion chamber has been reduced in WO2016012026, which discloses a plant comprising an infusion chamber in which the fluid foodstuff is subjected to a heat treatment by a feeding of steam, and a fluid foodstuff inlet connected to a plurality of openings at the top of the infusion chamber for creating a plurality of essentially downwardly directed separate fluid foodstuff jets. The infusion chamber has a bottom section configured to collect the fluid foodstuff from the jets. The bottom section has an outlet opening at the bottom of the infusion chamber for allowing the collected fluid foodstuff to exit the infusion chamber. The outlet opening is seamlessly connected to the inlet of a pump. A cooling jacket surrounds the bottom section for cooling the bottom section. The cooling jacket extends all the way down to the pump. By providing a seamless transition between the bottom section and the pump and by providing cooling around the bottom section and all the way down to the pump fouling and burn-on is reduced and results in longer and safer production time between cleanings, which significantly increases production efficiency of the infusion heat treatment plant. In a certain implementation of the invention the pump is a positive displacement pump, preferably a gear pump or a lobe pump.

It is, however, desirable further to minimize fouling and to obtain longer running times between cleaning operations and thereby achieve better production efficiency. Also, a more predictable length of run time before cleaning is needed would be desirable.

The object of the present invention is to avoid or reduce fouling in the pump when pumping heat sensitive fluids like whey protein concentrate, baby food, baby food liquid concentrates, nutritious drinks, skim milk, or cheese milk. Prevention or reduction of fouling of the impeller results in extended production run time between cleanings.

DETAILED DESCRIPTION

According to the invention there is provided a centrifugal pump for pumping a heat-sensitive fluid foodstuff, comprising a volute casing having an inlet port and an outlet port for the heat sensitive fluid, the volute casing enclosing an impeller comprising a disc operably associated with an end of a shaft, said disc having a first surface and a second surface opposite the first surface, said first surface facing the inlet of the casing and being provided with vanes, wherein the second surface of the disc of the impeller is exposed to a cooling medium.

Fouling of the impeller pumping heat-sensitive fluids causes difficulties in many foodstuff producing companies such as dairies, because of short run times between cleanings and the risk of fouling bits in the final product. The inventors have realised that the built-up of fouling on the surface of the impeller disc can be reduced by the present invention due to the cooling of the impeller disc from the opposite side of the disc. The reduced built-up of fouling increases the run time between cleanings of the impeller and further reduce the risk of having discolouring fouling bits in the final product.

The cooling of the surface of the disc opposite the disc surface with vanes, may be performed using a number of ready available measures, including transfer of cooling from a meandering or spiraling tube. In a certain embodiment of the invention the disc comprises a cooling cavity having an inlet and an outlet for cooling medium. The cooling cavity is at present regarded a more simple mechanical construction minimizing the production costs. To increase the heat/cool transfer the second surface of the disc may be provided with protrusions, corrugations or other structures for increasing the local velocity or agitation of the cooling medium.

The cooling cavity may be divided into two or more compartments for directing the cooling capacity to an area of the disc in need for cooling. Alternatively, the cooling cavity may be a co-axial annular enclosure. As experiments have shown that the co-axial annular enclosure provides sufficient cooling it is presently not regarded necessary to direct the cooling capacity.

The radius of the outer perimeter of the co-axial annular enclosure is usually 50% or more, such as 60%, 70%, 80% or more of the radius of the outer perimeter of the disc. A radius of the outer perimeter higher than 50% ensures a more uniform cooling of the surface of the disc with the vanes, i.e. also the periphery of the disc is sufficient cooled for fouling to be reduced. In other embodiments, the radius of the outer perimeter of the co-axial annular enclosure is 80% or less, such as 70%, 60%, 50%, 40% or less of the radius of the outer perimeter of the disc.

The inlet for the cooling medium may be positioned close to the shaft or distanced from the shaft in a radial direction. In an embodiment of the invention an inlet passage to the cooling cavity includes an annular space between the rotating shaft and/or the disc and the casing. This design ensures that the fouling at the centre part of the disc is reduced as fresh cooling medium first is directed to the centre part of the impeller disc before it is directed towards the more peripheral parts of the disc.

The outlet for the cooling medium may be positioned close to the shaft or distanced from the shaft in a radial direction. In a suitable embodiment, the cooling medium outlet is formed in the casing radially distanced from the inlet. The position of the outlet radially distanced from the inlet allows an assisted flow through the cooling cavity.

The cooling medium may be any liquid medium sufficiently easy flowing for conveying cooling to the second surface of the impeller disc. The cooling medium is different from the liquid foodstuff being pumped. In a preferred embodiment, the cooling medium is water. The cooling medium may be reused, i.e. it is circulated in a closed circuit. It that instance, the circuit includes an apparatus for extracting heat from the cooling medium, such as a heat exchanger. Furthermore, the cooling medium may be part of a cooling system for cooling several processes. In a certain embodiment, the so-called shaft seal water is reused as cooling medium.

For certain applications, it may be desirable to cool the fluid foodstuff entering the centrifugal pump. Where cooling at this point is performed, the volute casing comprises a cooling jacket attached to the part of the casing facing the vanes of the impeller. This cooling jacket may also be applied to prevent fouling on the inside of the volute casing facing the foodstuff side. The cooling jacket suitably extends substantially the entire circumference of the casing.

The present invention also relates to an infusion plant comprising an infusion chamber connected to a centrifugal pump, the infusion chamber comprises a fluid foodstuff inlet at the top of said infusion chamber for creating an essentially downwardly directed fluid foodstuff stream and an inlet for steam for subjecting the fluid food stuff to a heat treatment, said infusion chamber having a bottom section configured to collect the heated fluid foodstuff, said bottom section having an outlet opening at the bottom of said infusion chamber for allowing said collected fluid foodstuff to exit said infusion chamber, said outlet opening being connected to the inlet of a centrifugal pump, said centrifugal pump for pumping a heat-sensitive fluid foodstuff comprises a volute casing having an inlet port and an outlet port for the heat sensitive fluid, the volute casing enclosing an impeller comprising a disc operably associated with an end of a shaft, said disc having a first surface and a second surface opposite the first surface, said first surface facing the inlet of the casing and being provided with vanes, wherein the second surface of the disc of the impeller is exposed to a cooling medium.

In a preferred embodiment of the infusion plant it further comprises a cooling jacket surrounding the bottom section and at least a part of the casing facing the vanes of the impeller. A single cooling jacket for the bottom section and the upper part of the casing reduces the complexity of the plant and the operation thereof.

In a certain embodiment, the outlet opening of the infusion chamber is seamless connected to the inlet of the centrifugal pump. The seamless connection reduces the risk for formation of fouling.

In an embodiment of the invention the essentially downwardly directed fluid foodstuff stream is a plurality of essentially downwardly directed separate fluid foodstuff jets. The fluid foodstuff jets ensure a fast heating of the fluid foodstuff.

In an embodiment of the invention the outlet is an integral part of said bottom section and the pump casing is an integral with said outlet in order to obtain a seamless transition from said bottom section to said pump.

In an embodiment of the invention the outlet of said bottom section is welded directly to the inlet of said pump housing to form a seamless transition.

In an embodiment of the invention the bottom section has steel walls that are welded to an upwardly projecting flange or ridge of said pump casing.

In an embodiment of the infusion plant according to the invention the disc comprises a cooling cavity having an inlet and an outlet for cooling medium. In another embodiment of the infusion plant according to the invention the disc is cooled using a cavity having a co-axial annular enclosure. In a further embodiment of the infusion plant according to the invention the radius of the outer perimeter of the co-axial annular enclosure is 50% or more of the radius of the outer perimeter of the disc. In a further embodiment of the infusion plant according to the invention an inlet passage to the cooling cavity includes an annular space between the rotating shaft and/or the disc and the casing. In a further embodiment of the infusion plant according to the invention the cooling medium outlet is formed in the casing radially distanced from the inlet. In a further embodiment of the infusion plant according to the invention the volute casing comprises a cooling jacket attached to the part of the casing facing the vanes of the impeller.

The present invention also relates to the use of the centrifugal pump according to the invention or the infusion plant according to the invention, for treating whey protein concentrate, baby food, baby food liquid concentrates, nutritious drinks, skim milk, milk protein isolates, or cheese milk.

DESCRIPTION OF THE FIGURES

In the following the present invention will be described in further details with reference to the figures in which.

DETAILED DESCRIPTION OF THE FIGURES

Figure 1:
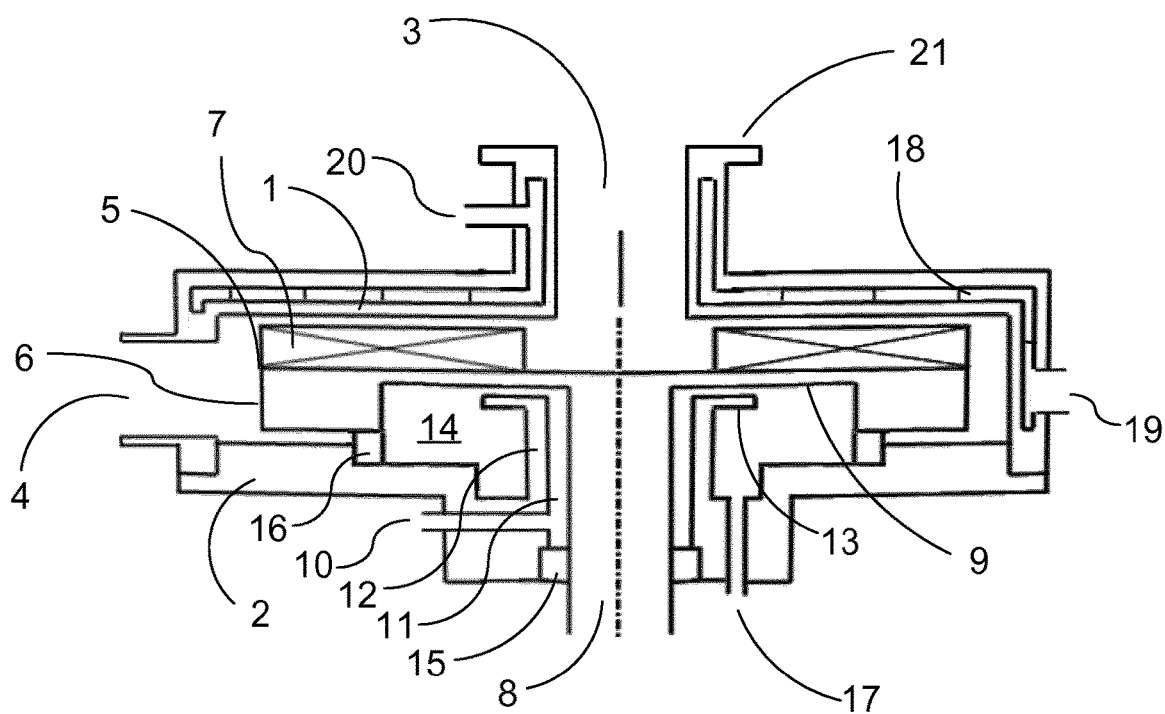
FIG. 1 shows a cross section of the centrifugal pump

FIG. 1 discloses a centrifugal pump for pumping a heat-sensitive fluid. The pump comprises a volute casing having an upper part 1 and a lower part 2. The upper part of the casing comprises an inlet 3 for the heat sensitive fluid. In the perimeter of the pump casing an outlet port 4 is arranged.

The volute casing encloses an impeller 5 comprising a disc 6 having a circular circumference. The disc has a surface with vanes 7 facing the inlet of the casing. Usually, the fluid enters through the inlet port along or near to the rotating axis. The centre of the disc is operably attached to an end of a shaft 8 to allow the disc to rotate when the shaft is rotated. The other end of the shaft is connected to a driver, such as an electrical drive motor, for performing the rotation. When the disc is rotated, the vanes will transport the fluid by conversion of the rotational kinetic energy to the hydrodynamic energy of the fluid flow. The fluid obtains a radial flow directed toward the perimeter of the volute casing and is discarded at the outlet port.

On a face 9 opposite the surface with vanes the disc of the impeller is cooled with a cooling medium. The cooling medium enters at inlet port 10 provided in the lower part of the volute casing near the axis. The cooling medium inlet port debouches in to an annular space 11 provided between the inner surface of a tube element 12 and the surface of the shaft. The lower part of the annular space is provided with a seal 15 for making a substantially liquid-tight connection between the rotating shaft and the casing. The upper part of the tube element is provided with a flange 13 for guiding the fluid into a cooling cavity 14. The cooling cavity is upwardly defined by a rotating upper surface forming the backside of a part of the disc. The lower part of the cooling cavity is defined by the static casing. Between the rotating disc and the stationary lower part of the casing a seal 16 is provided for the preparation of a substantially liquid-tight connection. The cooling cavity forms an essentially co-axial annular space. The seal is positioned towards the perimeter of the annular space for increased stability. The material for the seal is usually graphite for obtaining a low friction. The cooling medium leaves the cooling cavity through the cooling medium outlet port 17. The outlet is formed in the lower part of the casing axially distanced from the inlet to obtain an assisted flow through the cooling cavity.

The upper part of the casing is provided with a cooling jacket 18 for cooling the fluid entering and being processed by the centrifugal pump. The cooling jacket is attached to the part of the casing facing the vanes of the impeller and thus assist in cooling the fluid to reduce fouling. The cooling medium for the cooling jacket enters at inlet port 20. The cooling jacket extends in substantially the entire circumference of the casing and the cooling medium exits through outlet port 19 positioned at the tube forming the outlet. The inlet furthermore comprises a flange 21 for connection with other process equipment, notably a steam infusion chamber.

Figure 2:
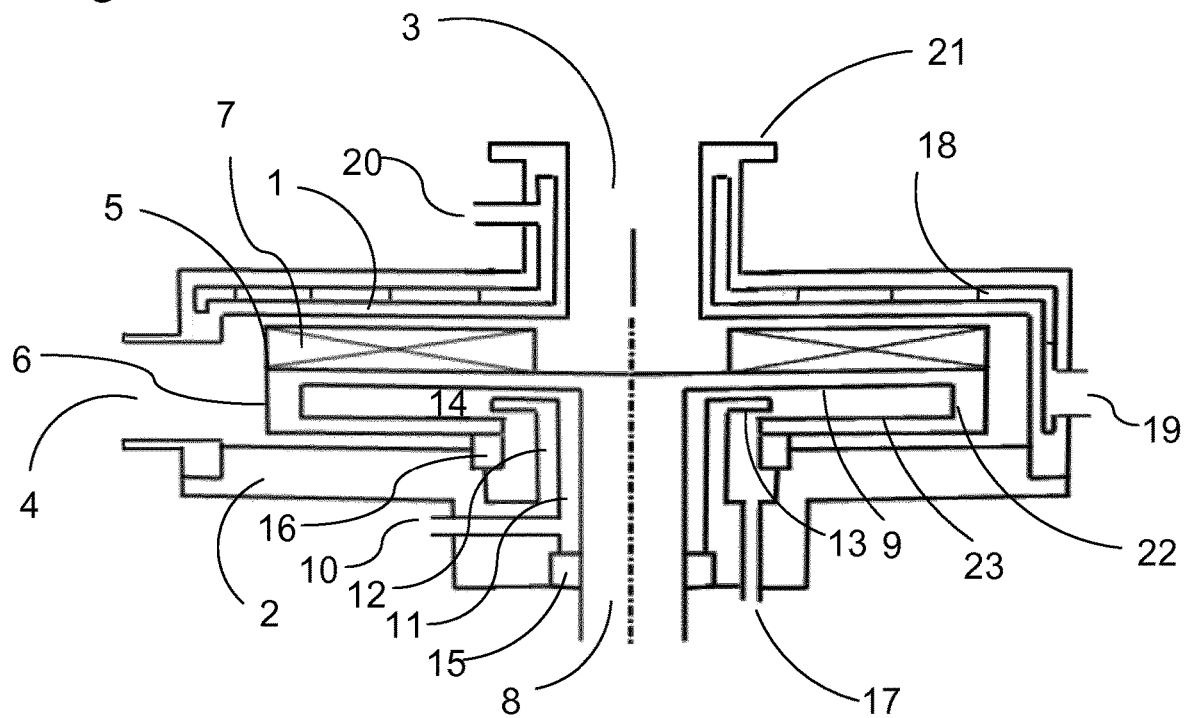
FIG. 2 shows a cross section of another embodiment of the centrifugal pump of FIG. 1.

FIG. 2 shows a modification of the embodiment of FIG. 1, in which the cooling cavity has been designed inside the impeller disc. According to this modified embodiment, the cooling medium enters at inlet port 10 and is conveyed to the annular space 11. Subsequently, the cooling medium is transport into the cooling cavity 14. The cooling cavity comprises an substantially annular enclosure defined by an upper surface 9, which is opposed to the disc surface with vanes, a cylinder section 22 at the outer perimeter, a surface 23 of the lower part of the disc, and the tip of the flange 13. The lower part of the disc rests on a seal 16 for water-tight connection of the impeller to the casing. The cooling medium exists at outlet 17.

Figure 3:
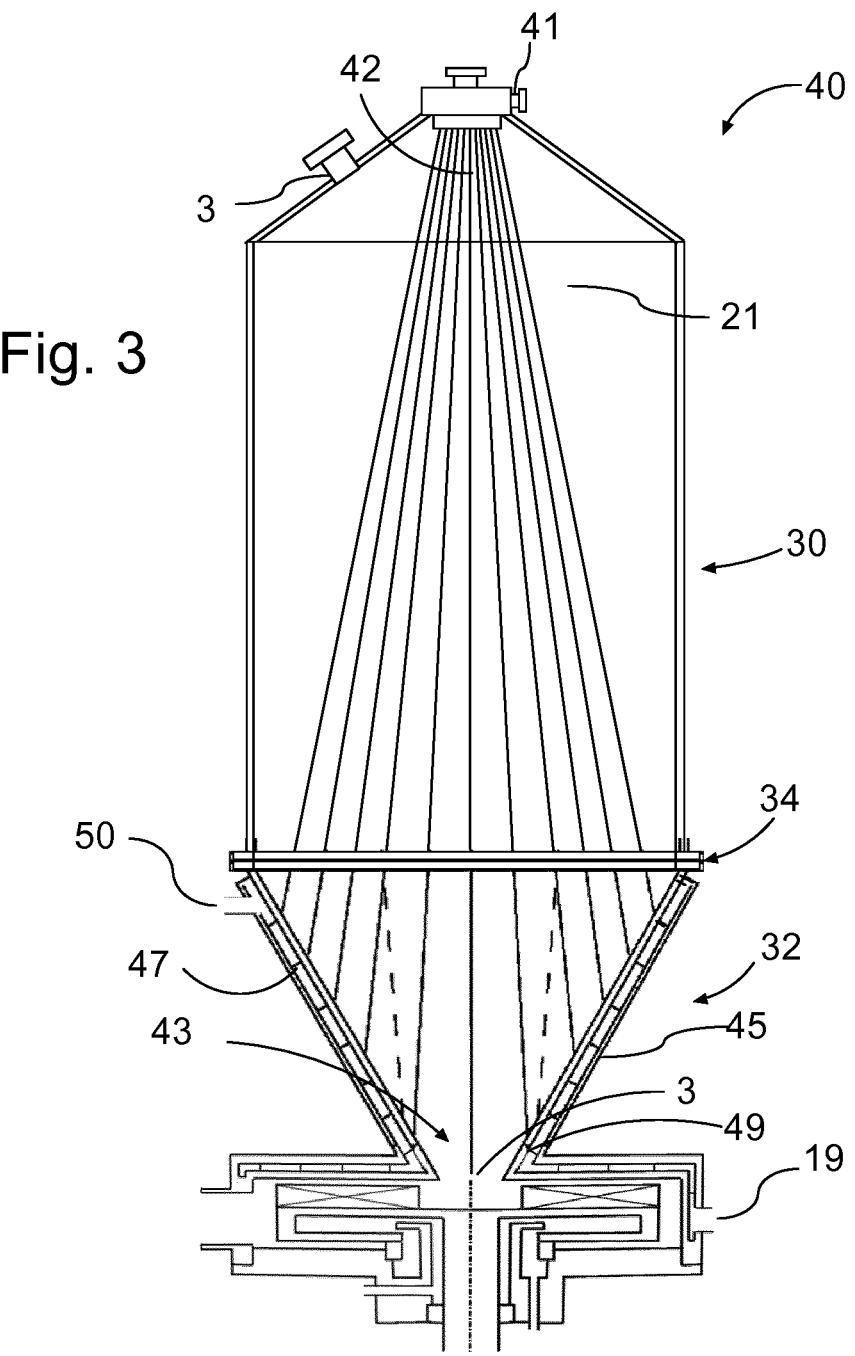
FIG. 3 shows a cross-section of the infusion plant.

FIG. 3 is a diagrammatic sectional view of the infusion chamber connected to a centrifugal pump. The infusion chamber is preferably essentially rotation symmetrical around a vertical axis. The upper section 30 of the infusion chamber has a hollow cylindrical part and a top part that is shaped similar to a conical frustum. A bottom section 32 is releasably connected to the upper section 30 by a flanged connection 34 for allowing access to the interior of the infusion chamber 40 for cleaning and/or maintenance. The bottom section 32 has in an embodiment a shape similar to a conical frustum. At the lower end of the infusion chamber there is an outlet opening 43 that is directly connected to the inlet of the centrifugal pump 1.

The fluid foodstuff to be treated is carried through the tube 41 into the infusion chamber 40. The fluid foodstuff enters the infusion chamber 1 as a bundle 42 of separate liquid foodstuff jets through a plurality of openings in a nozzle at the top of the infusion chamber 1. Hot steam is injected into the infusion chamber 1 through a circumferential steam distribution chamber in a well-known manner. In the infusion chamber 1 the liquid foodstuff jets meet the hot steam and the foodstuff is thereby heated and absorbs the steam.

The liquid foodstuff jets end on the funnel shaped inner wall of the bottom section 32. The bottom section 32 collects the liquid foodstuff from the liquid foodstuff jets and guides it to the outlet opening 43 at the lower end of the infusion chamber 1 (which is also the lower end of the bottom section 32 and which is also the inlet of the pump 3). A cooling jacket 45 is provided around the bottom section 32. The cooling jacket 45 keeps the bottom section 32 cool, to prevent or minimize the liquid foodstuff that gets into contact with the inner walls of the bottom section 32 to foul or burn-on. The cooling jacket 45 provides for a mantle of cooling water or other cooling medium around the bottom section 32. The mantle is divided by a spiral traverse wall 47 that guides the cooling water in a spiral pattern around the bottom section 32. The cooling water passes though the upper part of the casing and into a portion 49 of the mantle that extends also into the pump housing. From the portion 49 internal to the pump housing the spiral path of the cooling water continues spirally upwards towards the cooling medium outlet 50 at the top of the cooling jacket 45 and near the top of the bottom section 32.

The lower portion of the bottom section 32 forms the outlet opening 43 of the chamber that connects seamlessly to the inlet of the pump 3. This is in an embodiment achieved by the lower end of the bottom section 32 being made from steel plates, preferably stainless steel, and connected to the pump housing by welds.

In an embodiment the centrifugal pump is a described for FIG. 2 except for the cooling jacket as explained above and the inlet of the centrifugal pump as explained below. Regarding the inlet, the upper part of the casing is provided with a circular ridge or circular upright flange that facilitates welding of the pump casing to the lower end of the bottom section 32. After welding the transition between the bottom section 32 and the pump casing/pump inlet formed by the welds is machined to provide a perfectly smooth surface without and cracks or fissures that could be difficult to clean or rinse.

Figure 4:
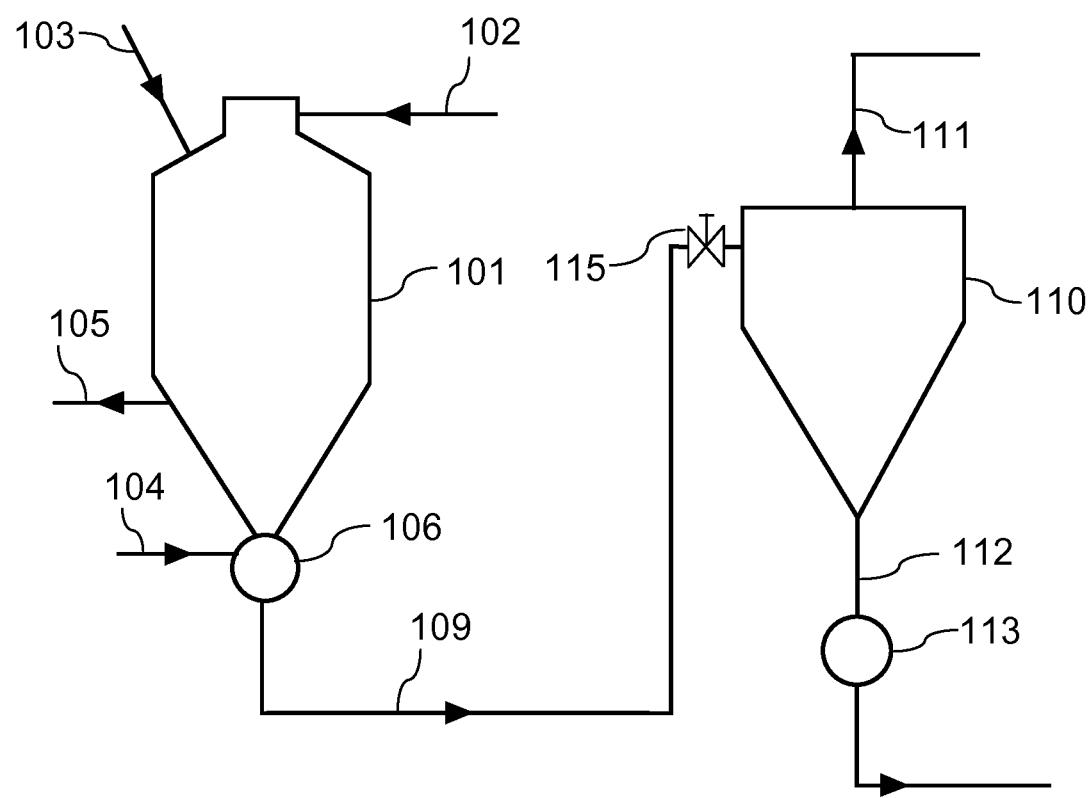
FIG. 4 shows an embodiment of a plant.

FIG. 4 discloses a plant for ultra-high temperature treatment of liquid foodstuff. The liquid foodstuff can be any foodstuff in liquid form, but the disclosed plant is particularly useful for temperature sensitive foodstuffs that should be heated for killing bacteria for a short period only so as to preserve their flavour, consistency and nutritious qualities. Examples of such liquid foodstuffs are milk, baby food liquid, baby food liquid concentrate or nutritional drinks (with high protein content). The liquid foodstuff may have a high dry matter content (40% and higher) and/or high protein content (6% or higher).

The plant of FIG. 4 has a second infusion chamber 101 of a conventionally known type. The second infusion chamber 101 is connected to a first tube 102 for feeding fluid foodstuff to be heat treated inside the second infusion chamber 101, and a second tube 103 for the feeding of steam. Finally, the second infusion chamber is connected to a third tube 104 and a fourth tube 105 for feeding and removing liquid for cooling the bottom of the second infusion chamber 101. In an embodiment the cooling liquid is water. The outlet of the second infusion chamber 101 directly connected with a centrifugal pump 106 according to the present invention. The outlet of the centrifugal pump 106 is connected to the expansion valve 115 at the inlet of a vacuum chamber 110 of a conventionally known type through a holding tube 109. The expansion valve 115 determine the end of the holding tube 109 and separates the high pressure zone in the holding tube from the low pressure vacuum zone in the vacuum chamber 110. The expansion valve 115 is controlled to generate a pressure higher than boiling pressure of the liquid in the holding tube, typically from 0,5 bar to 3 bar higher pressure. The vacuum chamber 110 is adapted to remove the amount of water being supplied in form of steam in the infusion chamber through a steam tube 111, whereas the concentrated fluid foodstuff is drained off through a tube 112 and a pump 113 in a conventionally known manner.

CLOSING COMMENTS

The term "comprising" as used in the claims does not exclude other elements or steps. The term "a" or "an" as used in the claims does not exclude a plurality.

Although the present invention has been described in detail for purpose of illustration, it is understood that such detail is solely for that purpose, and variations can be made therein by those skilled in the art without departing from the scope of the invention.

The invention claimed is:

1. A centrifugal pump for pumping a heat-sensitive fluid foodstuff, comprising a volute casing having an upper part, an inlet port in the upper part configured to be connected to an infusion chamber, a lower part and an outlet port for the heat sensitive fluid foodstuff on a perimeter of the volute casing between the upper part and the lower part, the volute casing enclosing an impeller comprising a disc operably associated with an end of a shaft, said disc having a center, a first surface and a second surface opposite the first surface, said first surface facing the inlet port of the casing and being provided with vanes, wherein the second surface of the disc of the impeller is exposed to a cooling medium, wherein the volute casing comprises a cooling cavity having a perimeter, a cooling medium inlet port attached to the lower part of the volute casing adjacent to the outlet port and a cooling medium outlet port in the lower part between the second surface of the rotating disc and the volute casing in fluid communication with the cooling medium inlet port and the cooling medium outlet port, wherein the center of the disc is horizontally centered in the volute casing or wherein the disc has a rotating axis that is horizontally centered in the volute casing, wherein the cooling cavity forms an essentially co-radial annular space between the second surface of the disc and the lower part of the volute casing, wherein a seal is positioned towards the perimeter of the essentially co-radial annular space, and wherein the upper part of the volute casing comprises a cooling jacket extending in substantially an entire circumference of the upper part of the volute casing and wherein the cooling jacket faces the vanes of the impeller.

2. The centrifugal pump according to claim 1, wherein the disc is cooled using a cavity having a co-axial annular enclosure.

3. The centrifugal pump according to claim 2, wherein the co-axial annular enclosure and the disc have an outer perimeter with a radius and wherein the radius of the outer perimeter of the co-axial annular enclosure is 50% or more of the radius of the outer perimeter of the disc.

4. The centrifugal pump according to claim 1, wherein an inlet passage to the cooling cavity includes an annular space between the shaft and/or the disc and the casing.

5. The centrifugal pump according to claim 1, wherein the cooling medium outlet port is formed in the casing radially distanced from the cooling medium inlet port.

6. An infusion plant comprising an infusion chamber connected to the centrifugal pump of claim 1, the infusion chamber comprises a fluid foodstuff inlet at the top of said infusion chamber for creating an essentially downwardly directed fluid foodstuff stream and an inlet for steam for subjecting the fluid food stuff to a heat treatment, said infusion chamber having a bottom section configured to collect the heated fluid foodstuff, said bottom section having an outlet opening at the bottom of said infusion chamber for allowing said collected fluid foodstuff to exit said infusion chamber, said outlet opening being connected to the inlet port of the centrifugal pump.

7. The infusion plant according to claim 6, further comprising an infusion chamber cooling jacket surrounding a bottom section of the infusion chamber and at least a part of the casing facing the vanes of the impeller.

8. The infusion plant according to claim 6, wherein the outlet opening of the infusion chamber is seamlessly connected to the inlet of the centrifugal pump.

9. The centrifugal pump according to claim 1, wherein the heat-sensitive fluid foodstuff is selected from the group consisting of whey protein concentrate, baby food, baby food liquid concentrates, nutritious drinks, skim milk, milk protein isolates, and cheese milk.

10. The centrifugal pump according to claim 1, wherein the center of the disc is operably attached to an end of the shaft.

11. The centrifugal pump according to claim 1, wherein the center of the disc is horizontally centered in the volute casing.

12. The centrifugal pump according to claim 1, wherein the disc has the rotating axis that is horizontally centered in the volute casing.

13. The centrifugal pump according to claim 1, wherein the cooling medium inlet port and/or the cooling medium outlet port is parallel to the outlet port for the heat sensitive fluid foodstuff.

14. A centrifugal pump for pumping a heat-sensitive fluid foodstuff comprising
- a volute casing having an upper part, an inlet port in the upper part configured to be connected to an infusion chamber, a lower part and an outlet port for the heat sensitive fluid foodstuff on a perimeter of the volute casing between the upper part and the lower part, the volute casing enclosing an impeller comprising a disc operably associated with an end of a shaft, said disc having a center, a first surface and a second surface opposite the first surface, said first surface facing the inlet port of the casing and being provided with vanes,
- wherein the second surface of the disc of the impeller is exposed to a cooling medium, wherein the volute casing comprises a cooling cavity having a perimeter, a cooling medium inlet port attached to the lower part of the volute casing adjacent to the outlet port and a cooling medium outlet port in the lower part between the second surface of the rotating disc and the volute casing in fluid communication with the cooling medium inlet port and the cooling medium outlet port,
- wherein the center of the disc is horizontally centered in the volute casing or wherein the disc has a rotating axis that is horizontally centered in the volute casing,
- wherein the cooling cavity forms an essentially co-radial annular space between the second surface of the disc and the lower part of the volute casing and wherein a seal is positioned towards the perimeter of the essentially co-radial annular space, wherein the upper part of the volute casing comprises a cooling jacket extending in substantially an entire circumference of the upper part of the volute casing and wherein the cooling jacket comprises a cooling inlet port and a cooling outlet port and wherein the outlet port is located between the upper part and lower part of the volute casing.

15. The centrifugal pump according to claim 14, wherein the fluid foodstuff is selected from the group consisting of whey protein concentrate, baby food, baby food liquid concentrates, nutritious drinks, skim milk, milk protein isolates, and cheese milk.

16. The centrifugal pump according to claim 14, wherein the cooling inlet port of the cooling jacket is in the upper part of the volute casing.

17. The centrifugal pump according to claim 14, wherein the disc is cooled using a cavity having a co-axial annular enclosure.

18. The centrifugal pump according to claim 17, wherein the co-axial annular enclosure and the disc have an outer perimeter with a radius and wherein the radius of the outer perimeter of the co-axial annular enclosure is 50% or more of the radius of the outer perimeter of the disc.

19. A centrifugal pump for pumping a heat-sensitive fluid foodstuff comprising
- a volute casing having an upper part, an inlet port in the upper part configured to be connected to an infusion chamber, a lower part and an outlet port for the heat sensitive fluid foodstuff on a perimeter of the volute casing between the upper part and the lower part, the volute casing enclosing an impeller comprising a disc operably associated with an end of a shaft. said disc having a center, a first surface and a second surface opposite the first surface, said first surface facing the inlet port of the casing and being provided with vanes,
- wherein the second surface of the disc of the impeller is exposed to a cooling medium, wherein the volute casing comprises a cooling cavity having a perimeter, a cooling medium inlet port attached to the lower part of the volute casing adjacent to the outlet port and a cooling medium outlet port in the lower part between the second surface of the rotating disc and the volute casing in fluid communication with the cooling medium inlet port and the cooling medium outlet port,
- wherein the center of the disc is horizontally centered in the volute casing or wherein the disc has a rotating axis that is horizontally centered in the volute casing,
- wherein the cooling cavity forms an essentially co-radial annular space between the second surface of the disc and the lower part of the volute casing and wherein a seal is positioned towards the perimeter of the essentially co-radial annular space, and
- wherein only the upper part of the volute casing comprises a cooling jacket.

20. The centrifugal pump according to claim 19, wherein the disc is cooled using a cavity having a co-axial annular enclosure.

21. The centrifugal pump according to claim 20, wherein the co-axial annular enclosure and the disc have an outer perimeter with a radius and wherein the radius of the outer perimeter of the co-axial annular enclosure is 50% or more of the radius of the outer perimeter of the disc.

* * * * *